United States Patent Office 3,105,003
Patented Sept. 24, 1963

3,105,003
PESTICIDAL PHOSPHORYLATED MERCAPTALS
AND MERCAPTOLES
Edward N. Walsh, Chicago Heights, Ill., and James T.
Hallett, Saratoga, Calif., assignors to Stauffer Chemical Company, New York, N.Y., a corporation of Delaware
No Drawing. Filed June 15, 1962, Ser. No. 202,694
10 Claims. (Cl. 167—22)

The present invention is concerned with a novel group of phosphorylated mercaptals, their method of preparation and use as pesticides.

The novel compounds may be represented by the general formula:

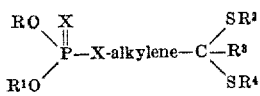

wherein alkylene means a divalent saturated aliphatic radical having from 1 to 3 carbon atoms; the groups represented by X are independently selected from the group consisting of sulfur and oxygen; R and $R^1$ are lower alkyl radicals; $R^2$ is selected from the group consisting of lower alkyl, carbalkoxyalkyl, benzyl, chloro-substituted benzyl, phenyl, alkylphenyl, and halo-substituted phenyl; $R^3$ is selected from the group consisting of hydrogen, lower alkyl, phenyl, and a radical of the formula:

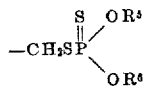

wherein $R^5$ and $R^6$ are lower alkyl radicals; and $R^4$ is selected from the group consisting of lower alkyl, carbalkoxyalkyl, benzyl, chloro-substituted benzyl, phenyl, alkylphenyl, halo-substituted phenyl, and a radical of the formula:

wherein X is the same as previously defined and $R^7$ and $R^8$ are lower alkyl radicals.

The lower alkyl radicals which are suitable for R, $R^1$, $R^2$, $R^3$, $R^4$, $R^5$, $R^6$, $R^7$, and $R^8$ are the straight and branched chain aliphatic radicals having from 1 to 8 carbon atoms and include, for example, methyl, ethyl, propyl, isopropyl, amyl, octyl, and the like. The carbalkoxyalkyl radicals included under the definition of $R^2$ and $R^4$ are those in which the alkoxy and alkyl portions of the radical each independently contain from 1 to 3 carbon atoms, for example, carbethoxymethyl, carbethoxyethyl, carbethoxyproply, and carbpropoxymethyl. The alkylphenyl radicals included under the definition of $R^2$ and $R^4$ include those in which the alkyl portion of the radical consists of straight or branched chain aliphatic substituents having a total of from 1 to 5 carbon atoms and may be substituted on one or more positions of the phenyl ring. The halo-substituted phenyl radicals included under the definition of $R^2$ and $R^4$ are preferably chloro- and/or fluoro-substituted.

The general process for preparing the compounds of the invention may be illustrated by the following equation:

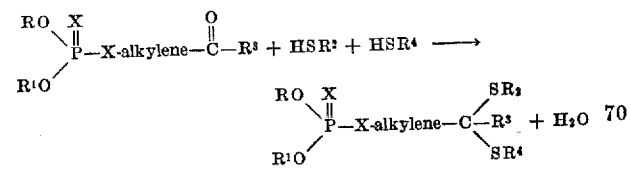

wherein all of the substituents are the same as defined above. The reaction is preferably carried out in the presence of a strong acid catalyst such as borontrifluoride etherate or gaseous HCl; and an inert solvent such as benzene, ether, and the like, may be used if desired. Reaction temperatures, while they need not be critically controlled during these mildly exothermic reactions, are normally maintained between about 0° C. and 100° C., preferably between 20° C. and 50° C. Higher temperature may cause appreciable side products to form due to an attack by the acid catalyst. In the preferred process, the mercaptans (or two moles of a single mercaptan when $R^2$ and $R^4$ are to be identical) are added to the phosphorylated aldehyde or ketone reactant before addition of the catalyst. When $R^2$ and $R^4$ are to be different radicals, one mercaptan may be first added, then some of the catalyst, and after the first reaction is fairly well along, usually within 10 to 30 minutes, the same order of addition may be used for reaction of the second mercaptan. Although the order of addition may have some slight effect on yields, it is not a critical feature of the invention.

Recovery of a pure phosphorylated mercaptal product from the reaction mixture requires washing the reaction mixture to remove side products, unreacted compounds, and the acid catalyst. For convenience, the reaction mixture may first be dissolved in an inert organic solvent such as benzene or ether. The washing may be accomplished with water or aqueous solutions of sodium hydroxide, sodium carbonate, sodium bisulfite (to remove the unreacted aldehyde or ketone), and the like. Normally, the reaction will yield between 80% and 98% of the theoretically predicted amount of phosphorylated mercaptal.

The following examples illustrate specific compounds of the invention and their method of preparation, but should not be construed as unduly limiting the broader aspects of the invention.

*Example 1*

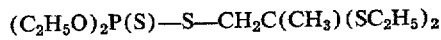

To 41.0 grams of $(C_2H_5O)_2P(S)S—CH_2C(O)CH_3$ contained in a reactor flask fitted with a stirrer and thermometer were added 83 ml. of ethane thiol. While stirring, hydrogen chloride was bubbled into the reactants. A mild exothermic reaction ensued; the temperature was held at 30 to 35° C. After 12 minutes, a cloudy precipitate formed. Calcium chloride, 3.0 grams, was added and the mixture was observed to clear, indicating that the precipitate was water. After separating the reaction mixture from the hydrated calcium chloride, gaseous HCl was again passed into the reaction mixture. The reaction was observed to subside after 33 minutes at which time an additional 10 ml. of ethane thiol was added. Gaseous HCl was thereafter added for one hour. The reaction mixture was left to stir overnight, then filtered and finally concentrated to 60° C. under 1 mm. Hg. The concentrated product consisted of 56.7 grams (96.3% yield) of O,O-diethyl-S-(2,2-diethyl-thio-propyl-1-) phosphorodithioate having an index of refraction $N_D^{25}=1.5420$ and analysis of 8.5% P and 37.2% S compared to 8.9% P and 36.8% S, theoretical.

The possibility of hydrolysis was investigated by stirring the product in N/10 NaOH (one gram of product per one ml. of NaOH solution) at room temperature for one week. The product was found to undergo no measurable hydrolysis by this test.

*Example 2*

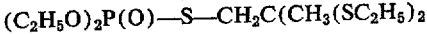

The reactor of Example 1 was charged with 27.2 grams of $(C_2H_5O)_2P(O)SCH_2C(O)CH_3$, 50 ml. of $C_2H_5SH$, and 5.0 grams of $CaCl_2$. A mild exothermic reaction occurred. Additional $CaCl_2$ was added in 5 gram increments (total, 20 grams) over a 30 minute period. After 30 minutes of reaction, at a temperature maintained between 28 to 33° C. the exothermic reaction subsided and a pasty emulsion formed. The reaction mixture was allowed to stir overnight at room temperature and then 100 ml. of ether was added. The untreated reaction mixture was filtered and the filtrate was concentrated by stripping off the ether. The concentrate was dissolved in 100 ml. of benzene, washed twice with 50 ml. of 1 normal NaOH solution, dried over $Na_2SO_4$, and reconcentrated to 60° C. at 1.5 mm. Hg to yield 13.7 grams of O,O-diethyl-S-(2,2-diethylthio-propyl-1-) phosphorothioate having an index of refraction $N_D{}^{25}=1.5170$.

The four specific compounds following were prepared by a procedure substantially in accordance with those of Examples 1 and 2:

Example 3

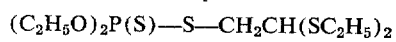

O,O-diethyl-S-(2,2 - diethylthio-ethyl-1-) phosphorodithioate; $N_D{}^{25}=1.5293$; yield=82% of theory; analysis: found, 11.2% P and 35.7% S; theory, 9.3% P and 38.4% S.

Example 4

1,2 - bis - (O,O - diethylphosphorodithio) - 1 - ethylthioethane; $N_D{}^{25}=1.5284$; yield=32% of theory; analysis: found, 13.3% P and 32.7% S; theory, 13.5% P and 32.7% S.

Example 5

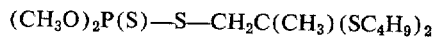

O,O-dimethyl-S - [2,2 - bis - (butylthio)-propyl-1-] phosphorodithioate; $N_D{}^{25}=1.5385$; yield=95.6% of theory; analysis: found, 8.0% P and 35.6% S; theory, 8.3% P and 34.1% S.

Example 6

O,O-dimethyl-S-[2,2 - bis - (ethylthio)-propyl-1-] phosphorodithioate; $N_D{}^{25}=1.5579$; analysis: found, 9.1% P and 42.6% S; theory, 9.7% P and 40.0% S.

Example 7

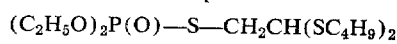

To 75 ml. of $C_4H_9SH$ and 3 drops of $C_2H_5O\cdot BF_3$ were added 31.8 grams of $(C_2H_5O)_2P(O)$—S—$CH_2CHO$ while stirring at 30° to 32° C. The reaction mixture was allowed to stir for 1.5 hours at which time gaseous HCl was bubbled in for 26 minutes. After stirring overnight, the reaction mixture was stripped to 60° C. at 2 mm. Hg. The concentrated product (37.5 grams—69% yield) analyzed as O,O-diethyl-S-[2,2 - bis - (butylthio) - ethyl-1-] phosphorothioate with 8.4% P and 25.7% S compared to 8.3% P and 25.8% S, theoretical.

The two specific compounds following were prepared by a procedure substantially in accordance with one or more of those described in the foregoing examples:

Example 8

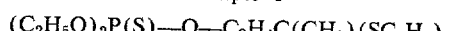

O,O-diethyl-O-[3,3 - bis-(ethylthio)-butyl-1-] phosphorothioate; $N_D{}^{25}=1.5000$; yield=51% of theory; analysis: found, 11.9% P and 25.3% S; theory, 9.0% P and 27.8% S.

Example 9

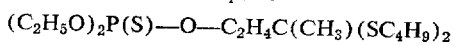

O,O-diethyl-O-[3,3 - bis-(butylthio)-butyl-1-] phosphorothioate; $N_D{}^{25}=1.4975$; analysis: found, 10.5% P and 23.0% S; theory, 7.8% P and 23.8% S.

Example 10

Into a mixture consisting of 10.0 grams of

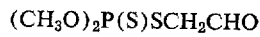

and 9.3 grams of $(C_2H_5O)_2P(S)SH$ was bubbled gaseous HCl while stirring at a temperature of 28±1° C. An exothermic reaction was observed. After one hour, 5 grams of $C_2H_5SH$ was added to the reaction mixture while continuing the HCl addition and a second exothermic reaction was noted. After the mixture stirred overnight it was dissolved in 200 ml. of benzene, washed with 100 cc. of 5% NaOH and 100 cc. of water, dried over $Na_2SO_4$ and stripped to 60° C. at 1 mm. Hg. The concentrate was 11.0 grams (52% yield) of 1-ethylthio-1 - (O,O - diethylphosphorodithio) - 2 - (O,O - dimethylphosphorodithio) ethane having an index of refraction $N_D{}^{25}=1.5680$ and an analysis of 13.9% P and 38.1% S compared to 14.3% P and 37.5% S, theoretical.

The following specific compounds were prepared by a procedure substantially in accordance with one or more of those described in the foregoing examples:

Example 11

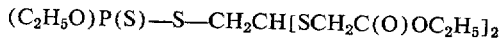

O,O-diethyl-S-[2,2-bis-(carbethoxymethylthio)ethyl-1-] phosphorodithioate; $N_D{}^{25}=1.5365$; analysis: found, 7.0% P and 30.1% S; theory, 6.8% P and 28.5% S.

Example 12

O,O - diethyl - S - [2,2-(diethylthio)-2-phenyl-ethyl-1-] phosphorodithioate; $N_D{}^{25}=1.5841$; yield=85.8% of theory; analysis: found 10.3% P and 26.5% S; theory, 7.6% P and 31.2% S.

Example 13

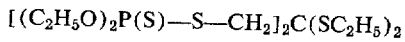

1,3 - bis - (O,O-diethylphosphorodithio)-2,2-bis-(ethylthio-)-propane; $N_D{}^{25}=1.5536$; yield=99% of theory; analysis: found, 12.2% P and 34.1% S; theory, 11.7% P and 36.2% S.

Example 14

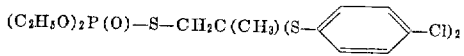

O,O-diethyl-S-[2,2-bis-(4-chlorophenylthio)-propyl-1-] phosphorothioate; $N_D{}^{25}=1.6068$; analysis: found, 6.1% P and 20.6% S; theory, 6.2% P and 19.2% S.

Example 15

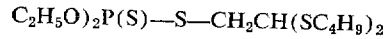

O,O-diethyl-S-[2,2-bis-(butylthio)-ethyl-1-] phosphorodithioate; $N_D{}^{25}=1.5301$; yield=83% of theory; analysis: found, 9.2% P and 31.9% S; theory, 8.0% P and 32.8% S.

Example 16

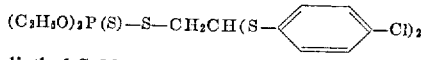

O,O-diethyl-S-[2,2-bis-(4-chlorophenylthio)ethyl - 1 - ] phosphorodithioate; $N_D{}^{25}=1.6100$; yield=75% of theory; analysis: found, 4.2% P, 25.3% S, and 16.5% Cl; theory, 6.0% P, 25.6% S, and 14.2% Cl.

Example 17

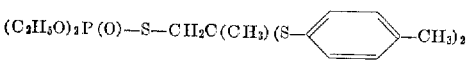

O,O - diethyl-S-[2,2-bis-(4-methylphenylthio)propyl-1-] phosphorothioate; $N_D{}^{25}=1.6164$; analysis: found, 22.1% P; theory, 21.1% P.

Example 18

$(C_2H_5O)_2P(S)-S-CH_2C(CH_3)(S-\langle\phantom{xx}\rangle-CH_3)_2$

O,O-diethyl-S-[2,2-bis-(4-methylphenylthio)propyl-1-] phosphorodithioate; $N_D^{25}=1.6007$; yield=97% of theory.

Example 19

$(C_2H_5O)_2P(S)-S-CH_2C(CH_3)(S-\langle\phantom{xx}\rangle-Cl)_2$

O,O-diethyl-S-[2,2-bis-(4-chlorophenylthio)propyl-1-] phosphorodithioate; $N_D^{25}=1.6100$; yield=94.4% of theory.

Example 20

$(C_2H_5O)_2P(S)-S-CH_2C(CH_3)(SCH_3)_2$

O,O-diethyl-S-(2,2-dimethylthio-propyl-1-) phosphorodithioate.

Example 21

$(C_2H_5O)_2P(O)-S-CH_2C(CH_3)(SCH_3)_2$

O,O-diethyl-S-(2,2-dimethylthio-propyl-1-) phosphorothioate.

Example 22

$(C_2H_5O)_2P(S)-S-CH_2CH(SC_3H_7-CO_2-C_3H_7)_2$

O,O-diethyl-S-[2,2-bis-(carbpropoxypropylthio)ethyl-1-] phosphorodithioate.

Example 23

$(C_2H_5O)_2P(S)-S-CH_2-C(CH_3)(SC_8H_{17})(SC_6H_5)$

O,O-diethyl-S-[2-octylthio-2-phenylthio-ethyl-1-] phosphorodithioate.

Example 24

$(CH_3O)_2P(S)-S-CH_2C(C_5H_{11})(SC_2H_5)(SCH_3)$

O,O-dimethyl-S-[2-ethylthio-2-methylthio-heptyl-1-] phosphorodithioate.

Example 25

$(CH_3O)_2P(S)-S-CH_2C[CH_2-S-P(S)(OC_2H_5)(OC_8H_{17})](SC_2H_5)_2$

O,O-dimethyl-S-[2,2(diethylthio)-3-(O-ethyl-O-octyl-phosphorodithio)-propyl-1-] phosphorodithioate.

Example 26

$(C_8H_{17}O)_2P(S)-S-CH_2C(CH_3)(SCH_3)_2$

O,O-dioctyl-S-(2,2-dimethylthio-propyl-1-) phosphonodithioate.

Example 27

$(CH_3O)(C_2H_5O)P(S)-S-CH_2C(CH_3)(SC_2H_5)(SC_4H_9)$

O-methyl-O-ethyl-S-(2-ethylthio-2-butylthio-propyl-1-) phosphorodithioate.

Example 28

$(C_2H_5O)_2P(S)-S-CH_2C(C_3H_7)(SC_3H_7)_2$

O,O-diethyl-S-[2,2-(dipropylthio)-amyl-1-]phosphorodithioate.

Example 29

$(C_2H_5O)_2P(S)-S-C_3H_6C(CH_3)(SC_2H_5)_2$

O,O-diethyl-S-[4,4-(diethylthio)-pentyl-1-] phosphorodithioate.

Example 30

$(C_2H_5O)_2P(S)-S-CH_2C(CH_3)(SC_2H_5)[SP(S)(OC_2H_5)(OC_8H_{17})]$

O,O-diethyl-S-[2-ethylthio-2-(O-ethyl-O-octyl-phosphorodithio)-propyl-1-] phosphorodithioate.

Example 31

$(C_2H_5O)_2P(O)-S-CH_2CH(SC_2H_5)(S-\langle\phantom{xx}\rangle(CH_3)-CH_3)$

O,O-diethyl-S-[2-ethylthio-2-(2',4'-dimethylphenylthio-)ethyl-1-] phosphorothioate.

Example 32

$(C_2H_5O)_2P(S)-S-CH_2CH(SC_2H_5)(S-\langle\phantom{xx}\rangle-C_4H_9\text{-tert})$ O,O-diethyl-S-(2-ethylthio-2-tert-butylphenyl-thio-ethyl-1-) phosphorodithioate.

Example 33

$(C_2H_5O)P(S)-S-CH_2C(CH_3)(SC_2H_5)(S-\langle\phantom{xx}(Cl)\rangle-F)$

O,O-diethyl-S-[2-ethylthio-2-(2'-chloro-4'-fluorophenylthio) propyl-1-] phosphorodithioate.

Example 34

$(C_2H_5O)_2P(S)-S-CH_2C(CH_3)(SCH_2-\langle\phantom{xx}\rangle-Cl)_2$

O,O-diethyl-S-[2,2-bis-(4'-chlorophenylmethylthio-)propyl-1-] phosphorodithioate.

The new compounds have been found to be generally active as pesticides. More significantly, however, the compounds exhibit unexpectedly high activity against mites, both embryonic and post embryonic forms, when applied directly or transmitted systemically through host plants, although they have a relatively low level of phytotoxicity. The combination of high miticidal activity plus low phytotoxicity makes the new compounds eminently suitable for agricultural applications wherein the toxicant may be applied directly to growing plants or mixed into the soil about the roots of such plants.

The high activity of the phosphorylated mercaptals is surprising since closely related compounds, wherein the acetal or ketal group is substituted for the mercaptal group of the new compounds, are either inactive against mites and other pests, or, at best, show a low order of activity. For example, the compound of the formula:

$$(C_2H_5O)_2\overset{O}{\underset{\|}{P}}-S-CH_2-C\overset{OC_2H_5}{\underset{OC_2H_5}{\diagdown}}-H$$

has low contact and systemic miticidal activity, whereas the phosphorylated mercaptal having the formula:

$$(C_2H_5O)_2\overset{O}{\underset{\|}{P}}-S-CH_2-C\overset{SC_2H_5}{\underset{SC_2H_5}{\diagdown}}-CH_3$$

has an $LD_{50}$ against post embryonic forms of the two-spotted mite, Tetranychus telarius, at a concentration of 0.01% of the compound in an inert dispersant. The systemic activity of this latter compound is extremely high, having an $LD_{50}$ at between 1 and 0.5 p.p.m., which is comparable to the most active commercial miticides currently available.

Pesticidal activity for the compounds of the foregoing examples is illustrated in Table I wherein the percentage kill among a group of test species is reported for a specified quantity of the toxic compound, expressed in micrograms (herein termed the bioassay test) or for a percentage concentration of toxicant contained in an inert carrier (herein termed the screening test). A slanted line is used to separate the percentage kill (on the left) from the percentage (or p.p.m.) concentration or amount of the candidate pesticide (on the right). In the table the various pest species are assigned the following numbers:
(1) House fly—*Musca domestica* (Linn.)
(2) American cockroach—*Periplaneta americana* (Linn.)
(3) Spotted milkweed bug—*Oncopetus fasciatus* (Dallas)
(4) Confused flour beetle—*Tribolium confusum* (Duvol)
(5) Two-spotted mite—*Tetranychus telarius* (Linn.)

was initially tested at a concentration of 100 p.p.m. As soon as the plants had been placed in the solution the exposed foliage was infested with mites. Mortalities of both embryonic and post-embryonic forms were determined fourteen days after initiation of the test.

In addition to the foregoing pesticidal activity, the

TABLE I
*Pesticidal Activity*

| Compound (Example Number) | 1 | 2 Percent | 3 Percent | 4 | 5 Post embryonic, percent | 5 Eggs, percent | 5 Systemic, p.p.m. |
|---|---|---|---|---|---|---|---|
| 1 | 100/0.1% | 0/0.1 | 0/0.1 | 85/0.1% | 30/0.0005 | 10/0.001 | 50/50 |
| 2 | 52/10 µg | 80/0.05 | 70/0.1 | 100/0.1% | 100/0.05 | 100/0.05 | 100/1 |
| 3 | 100/0.1% | 40/0.1 | 0/0.1 | 0/0.1% | 75/0.01 | 30/0.05 | |
| 4 | 100/0.1% | 0/0.1 | 0/0.1 | 0/0.1% | 95/0.005 | 100/0.01 | |
| 5 | 80/0.1% | 0/0.1 | 0/0.1 | 0/0.1% | 75/0.01 | 50/0.05 | 0/100 |
| 6 | 96/0.1% | 80/0.1 | 0/0.1 | 100/0.1% | 100/0.05 | 95/0.05 | 50/1 |
| 7 | 100/0.1% | 0/0.1 | 90/0.1 | 0/0.1% | 100/0.1 | 0/0.1 | |
| 8 | 100/0.1% | 40/0.05 | 0/0.1 | 70/50 µg | 30/0.1 | 0/0.1 | |
| 9 | 100/0.1% | 60/0.1 | 80/0.1 | 100/50 µg | 0/0.1 | 0/0.1 | |
| 10 | 100/0.1% | 40/0.1 | 0/0.1 | | 97/0.005 | 100/0.05 | 0/10 |
| 12 | 100/0.1% | 100/0.1 | 0/0.1 | | 50/0.01 | 50/0.05 | |
| 13 | 76/0.1% | 0/0.1 | 0/0.1 | | 50/0.01 | 75/0.1 | |

In the screening tests for species numbered 1 to 4 above, from ten to twenty-five insects were caged in cardboard mailing tubes 3⅛ inches in diameter and 2⅝ inches tall. The cages were supplied with cellophane bottoms and screened tops. Food and water were supplied to each cage, except in the case of the confused flour beetle which was primarily tested to determine fumigent action. Dispersions of the test compounds were prepared by dissolving one half gram of the toxic material in ten ml. of acetone. This solution was then diluted with water containing 0.015% Vatsol (a sulfonate-type wetting agent) and 0.005% Methocel (methyl cellulose) as emulsifiers, the amount of water being sufficient to dilute the active ingredient to a concentration of 0.1% or below. The test insects were then sprayed with this dispersion. After twenty-four and seventy-two hours, counts were made to determine living and dead insects.

Compounds which showed high mortality of house flies in the screening test were bioassayed on *M. domestica*. In this test, a known quantity of the toxicant was placed in a confined area. For the fly bioassay, the same cages were employed as for the screening tests. A weighed amount of the toxicant was placed in a 60 mm. diameter petri dish along with 1 ml. of acetone containing light spray oil. After the solution air dried, a cage containing twenty-five female flies was placed over the residue. Counts of living and dead insects were made after twenty-four and seventy-two hours.

Essentially the same procedure was followed in the confused flour beetle bioassay as in the house fly bioassay. For this test, however, twenty adult beetles were used. Mortality was checked at twenty-four and forty-eight hours.

The miticidal screening test for species number 5 above involved using young pinto bean plants in the primary leaf stage as host plants for the mites. The bean plants were infested with several hundred mites and then sprayed to run-off with an aqueous test dispersion prepared as described above. Sprayed plants were transferred to a greenhouse and held for fourteen days. The miticidal and ovicidal activity of the test compounds were determined after seven and fourteen days.

In testing for systemic miticidal activity, bean plants were placed in bottles containing 200 ml. of a test solution (or dispersion) and held in place with cotton plugs. Only the roots were immersed. The solutions were prepared by dissolving the canditate miticide in acetone or other suitable inert solvents and then diluting with distilled water. The final acetone concentration of the solution was never allowed to exceed 1% and the toxicant compounds of the invention have been found effective in controlling caterpillars, such as the salt-marsh caterpillar, *Estigmene acrea* (Drury), and aphids such as the pea aphid, *Macrosiphum pisi* (Harris). Therefore, since the compounds of the invention are generally active against a plurality of pest species and orders, the terms "pest," "pesticide," and the like, where used herein, are intended in the sense generally recognized in the art as applying to the lower forms of life customarily controlled by chemical means and excluding the higher animals, the vertebrates, e.g., rodents, birds and larger forms which are more commonly controlled by mechanical means such as traps. It will be apparent to one skilled in the art that the toxic activity of the new compounds demonstrated with the various test species described above is highly indicative of activity with other species and orders not shown.

Although the above test were accomplished with aqueous dispersions, the compounds may also be used in the form of aqueous solutions (when appreciably soluble), nonaqueous solutions, wettable powders, vapors, and dusts as may be best suited to the conditions of use. For more specialized applications, the compounds may even be used in a "pure," undiluted form.

The foregoing description is given for clearness of understanding only and no unnecessary limitations should be understood therefrom, as modifications will be obvious to those skilled in the art.

We claim:

1. A compound having the formula:

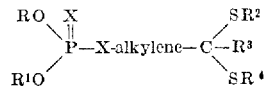

wherein alkylene means a divalent saturated aliphatic having from 1 to 3 carbon atoms; the groups represented by X are independently selected from the group consisting of sulfur and oxygen; R and $R^1$ are lower alkyl; $R^2$ is selected from the group consisting of lower alkyl, carbalkoxyalkyl, benzyl, chloro-substituted benzyl, phenyl, alkylphenyl, and halo-substituted phenyl; $R^3$ is selected from the group consisting of hydrogen, lower alkyl, phenyl, and a radical of the formula:

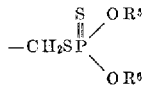

wherein $R^5$ and $R^6$ are lower alkyl; and $R^4$ is selected from the group consisting of lower alkyl, carbalkoxyalkyl, benzyl, chloro-substituted benzyl, phenyl, alkylphenyl, halo-substituted phenyl, and a radical of the formula:

wherein X is the same as previously defined and $R^7$ and $R^8$ are lower alkyl.

2. O,O-diethyl-S-(2,2-diethyl-thio-propyl-1-) phosphorodithioate.

3. O,O-diethyl-S-(2,2-diethylthio-propyl-1-) phosphorothioate.

4. 1,2-bis-(O,O-diethylphosphorodithio) - 1 - ethyl - thioethane.

5. 1,3-bis-(O,O-diethylphosphorodithio)-2,2-bis-(ethylthio-)-propane.

6. A method of controlling pests which comprises contacting the pests with a pesticidal amount of at least one compound having the formula:

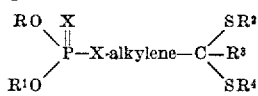

wherein alkylene means a divalent saturated aliphatic having from 1 to 3 carbon atoms; the groups represented by X are independently selected from the group consisting of sulfur and oxygen; R and $R^1$ are lower alkyl, $R^2$ is selected from the group consisting of lower alkyl, carbalkoxyalkyl, benzyl, chloro - substituted benzyl, phenyl, alkylphenyl, and halo-substituted phenyl; $R^3$ is selected from the group consisting of hydrogen, lower alkyl, phenyl, and a radical of the formula:

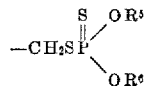

wherein $R^5$ and $R^6$ are lower alkyl; $R^4$ is selected from the group consisting of lower alkyl, carbalkoxyalkyl, benzyl, chloro-substituted benzyl, phenyl, alkylphenyl, halo-substituted phenyl, and a radical of the formula:

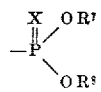

wherein X is the same as previously defined and $R^7$ and $R^8$ are lower alkyl.

7. A method of controlling pests which comprises contacting the pests with a pesticidal amount of O,O-diethyl-S-(2,2-diethyl - thio - propyl-1-) phosphorodithioate.

8. A method of controlling pests which comprises contacting the pests with a pesticidal amount of O,O-diethyl-S-(2,2-diethylthio-propyl-1-) phosphorothioate.

9. A method of controlling pests which comprises contacting the pests with a pesticidal amount of 1,2-bis-(O,O-diethylphosphorodithio)-1-ethylthioethane.

10. A method of controlling pests which comprises contacting the pests with a pesticidal amount of O,O-dimethyl-S-[2,2-bis-(ethylthio)-propyl-1-] phosphorodithioate.

References Cited in the file of this patent
UNITED STATES PATENTS

| | | |
|---|---|---|
| 2,956,074 | Dorken et al. | Oct. 11, 1960 |
| 2,959,516 | Sallmann | Nov. 8, 1960 |

OTHER REFERENCES

Reid: Organic Chemistry of Bivalent Sulfur, vol. 3, page 320, (1960).

Disclaimer

3,105,003.—*Edward N. Walsh*, Chicago, Heights, Ill. and *James T. Hallet*, Saratoga, Calif. PESTICIDAL PHOSPHORYLATED MERCAPTALS AND MERCAPTOLES. Patent dated Sept. 24, 1963. Disclaimer filed Dec. 21, 1970, by the assignee, *Stauffer Chemical Company*.
Hereby enters this disclaimer to claims 1, 2, 3, 6, 7, 8 and 10 of said patent.
[*Official Gazette April 20, 1971.*]